Dec. 29, 1959  A. G. BADE  2,918,825
MULTIPLE TAKE-OFF POWER TRANSMISSION
Original Filed Sept. 2, 1950  2 Sheets-Sheet 1

INVENTOR.
ALFRED G. BADE
BY
ATTORNEY

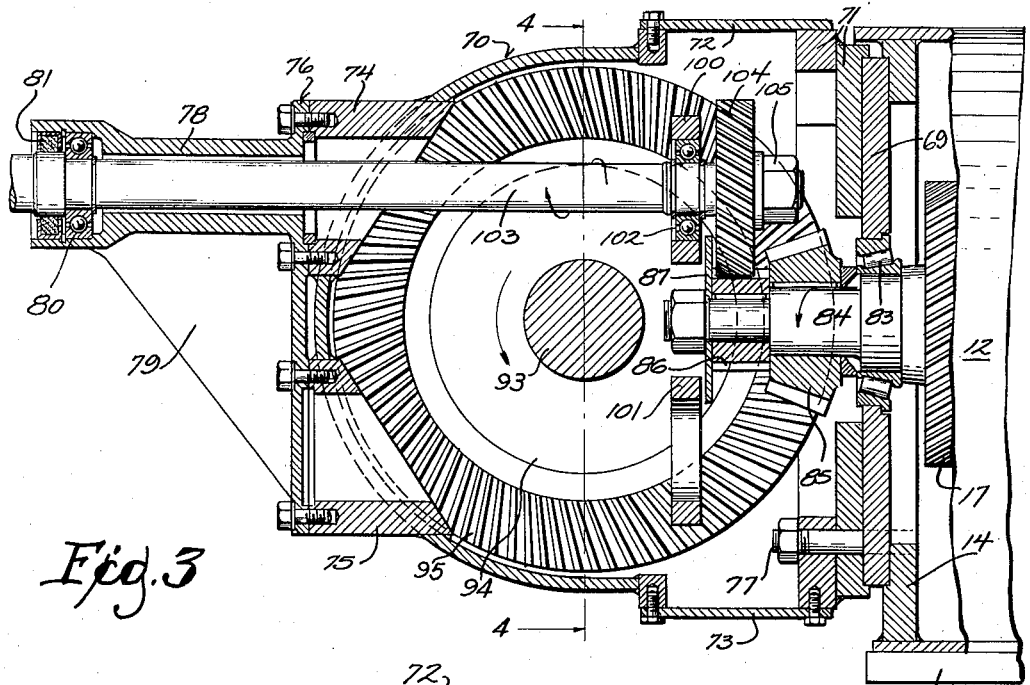

United States Patent Office 2,918,825
Patented Dec. 29, 1959

2,918,825

MULTIPLE TAKE-OFF POWER TRANSMISSION

Alfred G. Bade, Milwaukee, Wis., assignor to The Falk Corporation, Milwaukee, Wis., a corporation of Wisconsin Original application September 2, 1950, Serial No. 182,916, now Patent No. 2,755,686, dated July 24, 1956. Divided and this application December 12, 1955, Serial No. 552,651

7 Claims. (Cl. 74—325)

This invention relates to power drives for the operation of final drive shafts at right angles with each other and particularly to drives for sludge collectors in tanks for the clarification of liquids by sedimentation.

This application is a division from my co-pending application now Patent 2,755,686, issued July 24, 1956.

The clarification of liquids by sedimentation involves the use of large basins or tanks in which the liquid remains for a sufficient length of time in a relatively quiescent state to deposit the major portion of the solids suspended therein. In all of such basins or tanks, one or more collectors are provided for moving the sedimented solids to a sump from which the solids are withdrawn. When the tanks are rectangular, a number of collectors are usually provided to run longitudinally of each tank. In some instances at least, such tanks are provided with a single sludge sump and are accordingly provided with a transversely moving collector or cross-collector by which the sludge collected by several main or longitudinal collectors, is brought to the single sump.

A single drive unit should be provided for all of the sludge collectors in each tank, to minimize the machinery required. Several longitudinal collectors may be operated from a single main shaft but the cross-collector must be operated from a shaft extending at right angles to the main shaft. Because of the diversity in tank constructions and the various ways in which the sedimented sludge is collected, it is desirable to provide the drive for the collectors with a final drive unit in which both the direction of rotation of the shafts and the relative speeds of the shafts may be varied.

Because of the diversity of installations and conditions of operation thereof, it should also be possible to vary the drive by varying the size of the motor and/or the speed reducing gearing between the motor and the final drive in the minimum of time and without disturbance of the final drive. In some instances it is even desirable to make such change in operating installations with the minimum interruption in operation of such installation.

Because of the fact that the pull on the longitudinal collector shaft may be concentrated on one end of the shaft, it is necessary to provide a drive in which the stresses will be relatively uniformly distributed in only one of the drive sub-assembly casings regardless of the conditions of operation and in which the stresses will not be transmitted to the several gear trains in the drive either as a whole or individually. Hence, a single casing should support all other casings of the drive in overhung relation, and such casing must be sufficiently rigid to resist such stresses, while the shafts therein are supported in relatively large bearings which are well lubricated and readily changed.

It is therefore an object of the present invention to provide a drive from which power is taken at a plurality of points from shafts extending in at least two directions from the casing and in which the direction of rotation of some of the shafts and the relative speeds of such shafts may be readily varied.

Another object of the invention is to provide a drive for the delivery of power at a plurality of different points and in which stresses other than the normal operating stresses, are not transmitted to the several gear trains in the drive.

Another object of the invention is to provide a drive for the several sludge collectors of a sludge sedimentation installation, in which a single casing supports the other portions of the drive in overhung relation to avoid stressing such other drive portions especially upon the occurrence of unbalanced loads on the final drive, and to allow interchanging of the driving means and the speed reducer as required by operating conditions and without change in the final drive.

Another object of the invention is to provide a drive for the solids collectors in solids sedimentation installations, in which the parts are so related as to simplify adaptation to and adjustment to varying operating conditions and to simplify maintenance.

A further object of the invention is to provide a final drive for the sludge collectors of a liquids-solids separation system in which the longitudinal and cross-collectors for the sedimented sludge may be operated at different speeds and in which the speeds of the cross-collector shafts may be readily varied.

And a further object of the invention is to provide an improved power transmitting mechanism of the character above indicated which is simple and compact, readily adjustable to varying operating conditions, efficient in operation and which may be manufactured at relatively low cost.

Objects and advantages other than those above set forth will be apparent from the following description when read in connection with the accompanying drawing in which:

Fig. 3 is a cross-sectional view on plane 3—3 of Fig. 2, of the overhung final drive unit and through a fragment of a motor and a gear speed reducer unit; and Fig. 4 is a cross-sectional view taken on the plane of line 4—4 of Fig. 3.

Figure 1:
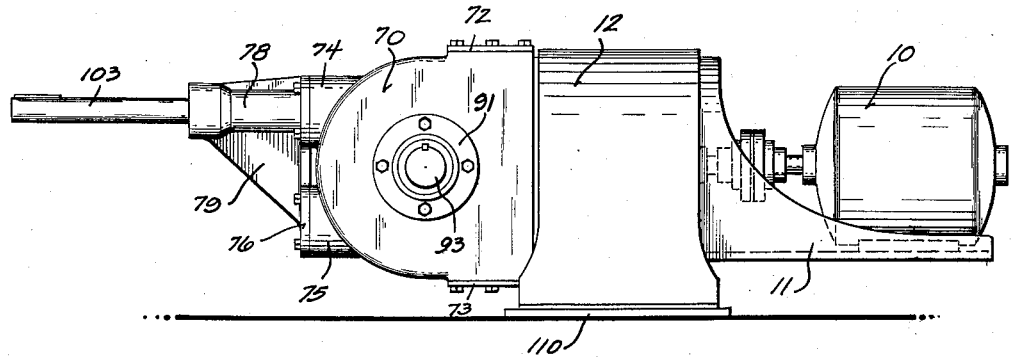
Fig. 1 is a side elevation of a drive in which a gear speed-reducer unit supports driving means and a final drive unit in overhung relation.
Figure 2:
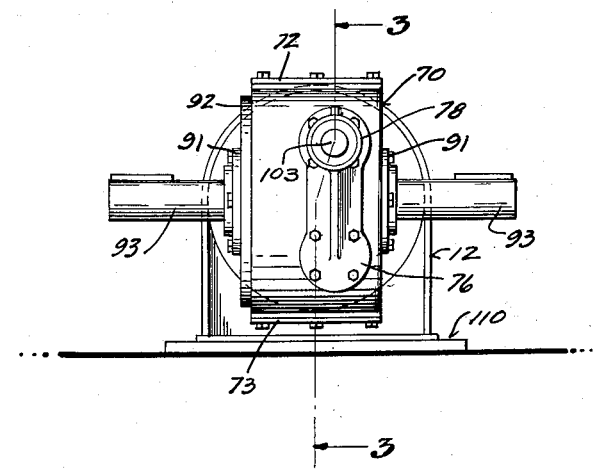
Fig. 2 is an end elevation of the drive.

Generally, the structure of the present drive includes means such as an electric motor for supplying power, a gear train unit for delivering power from the motor at a reduced speed and a final drive unit for delivering power at a plurality of points by way of two shafts, one of the shafts extending at a right angle to the other shaft. The final drive unit includes a casing in which is mounted gearing for driving both of the final drive shafts, the one shaft extending from the casing at both ends whereby power is delivered to at least three points. The second shaft is so connected with the final drive gearing that the speed of the second shaft relative to the first shaft may be easily varied. The direction of rotation of one shaft is readily changed by shifting the entire final drive unit relative to the speed reducer unit, in the present embodiment of the invention.

Referring particularly to the drawings by reference numerals in which like parts are indicated by like numerals, 10 designates an electric motor of which the direction of rotation is constant unless the wiring of the motor is reversed as is well known. The motor is supported on a bracket 11 extending from the casing of a speed reducer unit generally designated 12 in which is mounted a speed reducing gear train, of which only the final drive gear 17, of the speed reducing gear train is shown in Fig. 3. Both the motor and the speed reducer are standard articles of commerce and need not be further described.

A speed reducer casing end plate 14 (see Fig. 3) is in the nature of a rim or flange extending inwardly of the bottom and side plates of such casing. The end plate 14 has fitted thereto an adapter plate 69 as the support for a final drive unit generally designated 70 and of which an end plate 71 of the final drive unit casing is secured to the adapter plate. It will be seen that the final drive unit is mounted on the speed reducer housing by studs 77 passing through the adapter plate 69, end plate 71 and the speed reducer housing end plate 14.

The final drive casing sides are provided with apertures closed by plates 72 and 73 and such casing has extensions 74 and 75 on one side thereof of which only one is used at a given time. The casing extensions 74 and 75 are adapted to receive a unitary closure and extension comprising a plate portion 76 and a substantially cylindrical portion 78 and a web portion 79. The cylindrical portion 78 is enlarged at one end and counter-bored for the support of a shaft extensible therethrough. The enlarged end of the cylindrical portion 78 of plate 76 receives a bearing 80 (see Fig. 3) and a bearing retainer-seal structure 81 in readily removable manner. It will be seen that member 78 is readily placed to form a continuation of either extension 74 or 75 as desired and for a purpose to be described.

The adapter plate 69 has mounted thereon a bearing 83 of the type for resisting axial thrust thereon. Such bearing receives a shaft 84 with the speed reducer gear 17 thereon and also receives a bevel pinion 85 and another pinion 86. The bevel pinion 85 is now between the bearing 83 and the pinion 86 and the pinion 86 is of such width as to receive lubricant running from the bevel pinion, the bevel pinion dipping into the lubricant in the casing and lifting the lubricant due to its slow speed of rotation (5 r.p.m.) when the present drive is applied to a sludge collector. An oil slinger 87 also dips into the lubricant and conveys oil to the pinion 86 for the direction of rotation of the gears shown opposite to that shown in the drawings, the gears tending to squeeze the lubricant, coming from pinion 85 to pinion 86, out of mesh upon such opposite direction of rotation. The slinger 87 is rectangular in shape to clear other parts in the final drive casing 71—79 when such casing is rotated 180° from the position shown, as will be described.

The final drive casing has an aperture in one side thereof of only sufficient size to receive readily removable and replaceable bearing 90 which is retained in position in such casing side by a cap plate and seal structure 91. The other side of the final drive casing has an aperture of considerable size therein which is closed by a plate 92. Such plate also has an aperture in which is mounted another bearing 90 enclosed and sealed by another plate 91. The bearings 90 receive a shaft 93 having the ends thereof extending from the casing for receiving the final drive sprockets not shown. The shaft has fixed thereon a bevel gear comprising a plate 94 of a size to pass readily through the casing opening closed by plate 92, and a ring gear 95. The gear 94, 95 meshes with the bevel pinion 85 on the shaft 84.

The final drive casing is provided internally thereof with brackets 100 and 101 which are similarly placed relative to the axis of the shaft 84 but on opposite sides of the shaft axis. One or the other of such brackets receives a bearing 102 for supporting a shaft 103, the shaft being supported at the other end thereof by bearing 80. The shaft 103 is a cross-collector shaft in the present construction and carries a gear 104 meshing with the pinion 86. The shaft 103 is tapered to receive the gear 104 and is threaded to receive a nut 105 by which the gear is held on the shaft. It will thus be seen that the nut 105 and gear 104 are readily removable by way of an opening in the casing upon removal of the plate 72 so that the shaft 103 may be drawn out of the final drive casing portion 70 into the casing member 76—79. Such casing member is then reversed to place the shaft 103 in extension 75. The plate 73 is then removed for insertion of the bearing 102 in the bracket 101 and the gear 104 and nut 105 are replaced with the gear in mesh with the pinion 86. Such placement of the shaft 103 would reverse direction of rotation thereof relative to the shaft 93 except for rotation of the entire final drive unit as will be described.

Assuming that the direction of rotation of the bevel pinion 85 is as indicated by the arrow on the shaft 84 in Fig. 3, the shaft 93 will be driven in the direction of rotation indicated thereon in Fig. 3. Because of the placement of the brackets 100, 101, it is impossible to reverse the shaft 93 and the bevel gear 94, 95 so that the gear 94, 95 might be brought into mesh with the gear 85 to reverse the direction of rotation of the shaft 93. Hence, when reverse direction of rotation of the main shaft is desired, the entire final drive unit is rotated 180° which has the effect of reversing the relationship of gears 85 and 94, 95 and therefore of reversing the direction of rotation of the shaft 93. Such rotation of the final drive unit requires only that the nuts be removed from the studs 77 (externally accessible or accessible through openings usually closed by the plates 72 and 73), turning of the unit and replacement of the stud nuts. When the entire unit is rotated 180° as above described, the direction of rotation of the shaft 93 is reversed from its previous direction of rotation. Movement of the cross-collector shaft 103 as above described merely shifts such shaft from the left to the right (or vice versa) relative to the vertical center line of the drive unit and does not reverse its direction of rotation so that the cross-collector continues to move in the given direction. The speed reducer casing is now mounted on special and similar foot plates of which only plate 110 is shown, and which extend the base of such casing beyond the normal mounting feet thereof.

It will be seen that all the drive is overhung from a single casing thus relieving the other drive units and particularly the various gear trains from operating stresses heretofore transmitted thereto. The cross-collector is driven by a simple and easily changed gear train so that its speed may be readily altered. The direction of rotation of the main shaft is changed merely by rotating the entire final drive casing which eliminates all possibility of misalignment of parts therein.

Although but one embodiment of the present invention has been illustrated and described, it will be apparent that various changes and modifications may be made therein without departing from the invention as defined in the appended claims.

I claim:

1. In a gearing unit for reversibly delivering power, a casing, a pinion extending into the casing for transmitting power thereto, a plurality of shafts mounted in the casing at right angles to each other, and a gear mounted on one of the shafts for meshing with the pinion, the casing being rotatable 180° relative to the pinion and shifting the gear from a plane on one side of the pinion to a plane on the opposite side of the pinion parallel with the first said plane for shifting the meshing point of the gears by 180° and thereby reversing the direction of rotation of only the said one shaft.

2. In a geared drive for sludge collectors in a sedimentation tank, a casing, means for supporting the casing in rotatable relation thereto, a pinion gear extending into the casing for transmitting power thereto, a plurality of shafts in the casing at right angles to each other for severally delivering power to the sludge collectors, and a gear on one of the shafts meshing with the pinion in given relation upon given relative positioning of the casing and the supporting means, rotation of the casing relative to the supporting means by 180° from the given relative positioning and shifting the gear 180° from a plane on one side of the pinion center line to a parallel plane on the opposite side of the pinion for reversing the direction of rotation of only the said one shaft.

3. In a geared drive for sludge collectors in a sedimentation tank, a casing, means supporting the casing, the casing being detachable from and rotatable relative to the supporting means, a bevel pinion gear extending into the casing substantially on one axis thereof, a plurality of shafts mounted in the casing at right angles to each other for severally delivering power to the sludge collectors, one of the shafts being on an axis of the casing intersecting the said one axis, and a bevel gear fixed on the one shaft and meshing with the bevel pinion at one end of a diameter thereof in either of two given relative positions of the casing and the supporting means, rotation of the casing 180° relative to the supporting means and from either of two given positions shifting the meshing point of the gears 180° and reversing the direction of rotation of only the said one shaft and the gear thereon.

4. In a final drive unit for the main and cross-collectors of sludge in a sedimentation tank, a casing having an open side, a removable plate for closing the open side of the casing, a main shaft extending through and transversely of one casing axis, gearing for driving the main shaft, one gear being fixed on the main shaft and removable therewith through the open casing side, a cross-shaft mounted in and extending parallel to the said one axis of the casing, and a gear train driven by the gearing for driving the cross-shaft, the gear train being accessible upon removal of the main shaft and the gear thereon from the casing for interchange of gears in the gear train whereby the speed of the cross-shaft is varied.

5. In a final drive unit for the main and cross-collectors for sludge in a sedimentation tank, a casing, a casing extension detachably mounted on the casing for placement in either of two positions, a power supply shaft extending into the casing, a main shaft extending transversely through the casing, power supply gearing on the power supply shaft within the casing, a gear on the main shaft meshing with a part of said power supply gearing, a cross-shaft in the casing and in the casing extension and extending transversely of the main shaft, a gear on the cross-collector shaft for meshing with another part of said power supply gearing, and means in the casing for supporting an end of the cross-shaft therein in either of the two positions of the casing extension whereby the direction of rotation of the cross-shaft depends on its position in the casing.

6. In a final drive unit for the main and cross-collectors for sludge in a sedimentation tank, a casing, a power supply shaft extending into the casing, a main shaft extending transversely through the casing, a casing extension detachably mounted on the casing for placement in either of two positions laterally of the main shaft, power supply gearing on the power supply shaft within the casing, a gear on the main shaft meshing with a part of the said power supply gearing, a cross-shaft in the casing and in the casing extension and extending transversely of the main shaft, a gear on the cross-collector shaft for meshing with a part of said power supply gearing, and means in the casing radially of the main shaft on two sides thereof and in alignment with the casing extension in each of its positions for supporting an end of the cross-shaft therein whereby the direction of rotation of the cross shaft depends on its position in the casing.

7. In a final drive unit for the main and cross-collectors for sludge in a sedimentation tank, a casing, a power supply shaft extending into the casing, a main shaft extending transversely through the casing, a casing extension detachably mounted on the casing for placement in either of two positions radially offset from the main shaft and to one side of a diameter thereof, power supply gearing on the power supply shaft within a casing, a gear on the main shaft meshing with a part of said power supply gearing, a cross-shaft in the casing and in the casing extension and extending transversely of the main shaft and from the casing extension, a gear on the cross-collector shaft for meshing with a part of said power supply gearing, and brackets within the casing for alternatively supporting an end of the cross-shaft, the brackets being severally in alignment with the casing extensions in the two positions thereof and to one side of a diameter of the main shaft whereby the direction of rotation of the cross-shaft is reversed upon placing the casing extension and cross-shaft in different positions and utilizing different brackets in the casing for the cross-shaft end.

References Cited in the file of this patent

UNITED STATES PATENTS

| | | |
|---|---|---|
| 745,814 | Gibbs | Dec. 1, 1903 |
| 1,788,978 | Buckendale | Jan. 13, 1931 |
| 2,011,597 | Stout | Aug. 20, 1935 |
| 2,444,656 | Lamatsch | July 6, 1948 |
| 2,478,059 | Scofield | Aug. 2, 1949 |
| 2,555,016 | Trofinov | May 25, 1951 |
| 2,566,253 | Schmitter | Aug. 28, 1951 |
| 2,641,139 | Beisner | June 9, 1953 |
| 2,657,591 | Kallin | Nov. 3, 1953 |
| 2,854,853 | Willoughby | Oct. 7, 1958 |